Patented Feb. 9, 1932

1,844,634

UNITED STATES PATENT OFFICE

LYMAN S. BUSHNELL, OF FREEPORT, TEXAS, ASSIGNOR TO THE FREEPORT SULPHUR COMPANY, OF FREEPORT, TEXAS

METHOD OF TREATING SULPHUR

No Drawing. Application filed September 3, 1929. Serial No. 390,200.

The invention relates particularly to an improved method of treating sulphur after it has been removed from the earth.

As sulphur is recovered from the earth it is usually contaminated with various impurities which are co-mingled with the sulphur and which may not be removed readily by filtration or similar methods. By the processes now in vogue the sulphur is recovered from the earth by reducing it to a molten condition by means of heated fluids in the strata where the sulphur occurs. This molten sulphur is then forced or drawn to the earth's surface and is ready to be used commercially. However, the sulphur is sometimes more or less discolored due to the contaminating substances therein, the principal source of these substances being oil and similar deposits with which the sulphur has come in contact. It is well known that sulphur changes from a solid to a fluid state at 240° F. and remains in a fluid, but more or less viscous, condition at higher temperatures. The sulphur, however, is most fluid at about 280° F. to 300° F. and it is therefore desirable to handle it at about this temperature. When removing the sulphur from the earth if it is subjected to temperatures above 320° F. for any considerable time it then becomes discolored so that in locating the various wells on the sulphur dome it is sometimes impossible to recover the sulphur before it becomes discolored from over-heating. Even at ordinary temperatures sulphur sometimes becomes contaminated with oil or petroleum residues, causing discoloration.

It is one of the objects of this invention to provide an improved method of treating the sulphur to restore its lustre.

Another object of this invention is to reduce in quantity the impurities, particularly those of petroleum origin, as these are objectionable for some of the uses to which sulphur is put.

Another object of the invention is to treat the sulphur while in a molten condition by spraying it with chemicals which will react with the contaminating substances.

Another object of the invention is to spray the molten sulphur with sulphuric acid.

A still further object of the invention is to so co-mingle the molten sulphur and the chemical re-agents that the contaminating substances will be subjected to chemical action with the re-agent.

Another object of the invention is to treat the sulphur with a chemical which will have the proper reaction with the contaminating substances to oxidize, carbonize or char them so that they may be readily removed by either washing or filtration processes or both.

It is also an object of the invention to treat the sulphur with chemicals which will react with the contaminating substances and reduce them to a form which may be speedily removed by filtration.

Other and further objects of the invention will be readily apparent to those skilled in the art to which the improvement appertains when the following description is considered.

In the past various methods and substances have been resorted to for the treatment of the sulphur to remove contaminating substances and to improve its lustre and color, but the present method is believed to surpass those formerly in use as a brighter sulphur results and the method is simple and economical due to the fact that sulphuric acid is the principal product manufactured from sulphur.

It is important from a commercial standpoint that the sulphur be produced for use as a bright yellow material. For some purposes the discolored sulphur is satisfactory but it is not successful from a commercial standpoint due to the discoloration and it is with this in mind that the present method has been devised to restore the original color of the sulphur. When the sulphur is in molten condition it may be filtered through sand and similar materials. The action of the sand or filtering material, however, is believed to be that of absorption or adsorption and the efficiency of the filtering material is soon impaired. This process is very slow and has not been found to be entirely successful, but if the nature of the discoloring impurities is so changed by charring, carbonizing or oxidizing, the final separation of the impurities from the sulphur becomes merely one of filtration or straining and may be accomplished more easily and quickly as a coarser filtering medium may be used.

It is my intention to treat the sulphur with chemicals which will tend to react chemically with the contaminating substances which may be petroleum oil, bitumens or other carbonaceous materials. It is understood that these contaminating substances are partly organic and partly inorganic, and are usually in a very finely divided state or in the form of a film, or dissolved in the sulphur, so that it is practically impossible to filter them from the sulphur. However, with my improved process I contemplate treating the sulphur with various chemicals such as sulphuric acid. Acids of this type react with the contaminating substances directly, thus tending to oxidize, carbonize or char the substances in such a way that the particles may be altered both as to form and chemical composition. When the sulphur has been so treated it has been found that subsequent filtration and/or washing will remove substantially all of the contaminating substances.

In order to accomplish my improvement I have devised a process wherein the molten sulphur may be forced from a spray into any suitable container at the desired temperature and pressure. While the sulphur is in a finely divided state it is brought into contact with a spray or mist of the acid or chemical so that a very intimate contact of the acid and the sulphur is obtained. It is desired to use a solution of the acid which is preferably of different specific gravity than that of the sulphur so that the sulphur will tend to pass downwardly through the mist or spray of the acid and also if the acid and sulphur accumulate in the spray tank that the sulphur will sink to a position below that of the acid, although an acid heavier than molten sulphur might be used, in which case the acid would occupy the lower layer. In this manner the acid may be re-circulated and used repeatedly to treat the sulphur in a continuous process. Suitable means may be provided to maintain either or both the sulphur and the acid at the desired temperature and pressure to obtain the most effective treatment.

After the sulphur has been treated in this manner it appears as a dark and discolored substance. However, upon washing with water and/or filtering a bright and lustrous sulphur is obtained. It is believed that the acid or chemicals used tend to char and oxidize the impurities so that their form and composition is so altered that they no longer intimately mingle or remain in association with the sulphur particles. When the contaminating substances have been so changed it is found that they may be readily separated from the sulphur by washing and filtering whereas washing and filtering before treatment removed practically none of these substances.

In filtering sulphur it has been found that the best results have been obtained by using a fine filtering medium, and that the results obtained vary directly with the coarseness of the medium, accordingly to obtain satisfactory results heretofore a very fine medium has been used and resulted in slowing the filtering process. However, after the sulphur has been treated as above explained the change in the discoloring particles has been such that they may be removed by washing or filtering thru a relatively coarse medium with satisfactory results and the speed of filtration has thus been materially increased.

For purposes of illustration, it has been found that 60° Baumé sulphuric acid serves very satisfactorily as it has a specific gravity of approximately 1.706 which is slightly less than the specific gravity of the sulphur when it is in molten condition.

I do not desire to be limited to the specific use of sulphuric acid as obviously other oxidizing agents may be used which will prove satisfactory for the purposes in view and it is also to be understood that the sulphur may be treated in the manner just described when it is in a finely pulverized state, and it is not intended that the present invention be limited to the treatment of molten sulphur.

Having thus described my invention, what I claim as new is:

1. In a process of removing discoloring substances from sulphur, the steps of melting the sulphur, spraying the molten sulphur into contact with an acid spray which will react chemically with the discoloring substances and filtering the substances from the sulphur after the reaction.

2. In the process of removing discoloring substances from sulphur, the steps of spraying the molten sulphur and an acid which will oxidize the discoloring substances, bringing said sprays into intimate contact with each other and removing the substances from the sulphur after the reaction by washing.

In testimony whereof I hereunto affix my signature this 15th day of August, A. D. 1929.

LYMAN S. BUSHNELL.